United States Patent [19]

Maeda

[11] Patent Number: 4,812,516
[45] Date of Patent: Mar. 14, 1989

[54] POLYMER COMPOSITION

[75] Inventor: Tetsuro Maeda, Ichihara, Japan

[73] Assignee: Denki Kagaku Kogyo Kabushiki Kaisha, Tokyo, Japan

[21] Appl. No.: 200,909

[22] Filed: Jun. 1, 1988

Related U.S. Application Data

[62] Division of Ser. No. 943,696, Dec. 19, 1986, Pat. No. 4,774,291.

[30] Foreign Application Priority Data

Dec. 26, 1985 [JP] Japan .................................. 60-292193
Jan. 8, 1986 [JP] Japan .................................... 61-1539
Jan. 8, 1986 [JP] Japan .................................... 61-1540

[51] Int. Cl.$^4$ .................. C08L 9/00; C08L 51/04; C08L 55/02; C08L 25/04
[52] U.S. Cl. ........................................ 525/83; 525/80; 525/81; 525/82; 525/84; 525/85
[58] Field of Search ..................... 525/80–81, 525/82, 83, 84, 85

[56] References Cited

U.S. PATENT DOCUMENTS

| | | | |
|---|---|---|---|
| 3,041,307 | 6/1962 | Baer ........................................ | 525/85 |
| 3,055,859 | 9/1962 | Vollmert ............................... | 525/227 |
| 3,475,516 | 10/1969 | Bauer et al. ........................... | 525/85 |
| 4,473,679 | 9/1984 | Falk et al. ............................. | 524/432 |

FOREIGN PATENT DOCUMENTS 859217 12/1970 Canada .

Primary Examiner—Carman J. Seccuro
Attorney, Agent, or Firm—Oblon, Fisher, Spivak, McClelland & Maier

[57] ABSTRACT

A polymer composition obtained by mixing, in an emulsion state, (A) from 20 to 90% by weight (as solid content of polymer) of an emulsion of polymer component (A) which is a polymer of a vinyl monomer and has a glass transition temperature of higher than 20° C., a gel content of not higher than 10% and a solubility parameter of from 8.0 to 11.0 (cal/cc)$^{\frac{1}{2}}$ and which has a weight average molecular weight, based on polystyrene, of at least $1.5 \times 10^5$, and (B) from 10 to 80% by weight (as solid content of polymer) of an emulsion of polymer component (B) which is a homopolymer of an acrylate monomer, a copolymer of acrylate monomers or a copolymer of an acrylate monomer with other copolymerizable monomer and has a glass transition temperature of not higher than 20° C., a gel content of not higher than 70% and a solubility parameter of from 8.4 to 9.8 (cal/cc)$^{\frac{1}{2}}$, and separating the polymer from the emulsion mixture.

13 Claims, No Drawings

POLYMER COMPOSITION

This is a division of application Ser. No. 943,696, filed Dec. 19, 1986, now U.S. Pat. No. 4,774,291.

The present invention relates to a thermoplastic resin composition having excellent environmental stress cracking resistance and capable of presenting a molded product having an improved surface condition. Further, the present invention relates to a polymer composition capable of presenting such a thermoplastic resin composition.

When an elastomer-containing styrene resin is brought in contact with chemical agents under stress, a cracking phenomenon is frequently observed, and in an extreme case, rupture takes place. Such a phenomemon is called an environmental stress cracking phenomenon, and is distinctly observed with a chemical agent having a poor solubility to the resin, such as an alkane, an alkene, an alcohol, a carboxylic acid or an ester, as is well known.

Such an environmental stress cracking phenomenon occurs even when no external force is exerted to the molded resin product, since it results from the release of a residual internal molding strain when the molded product is brought in contact with the chemical agent. Thus, the environmental stress cracking phenomenon puts a substantial restriction to the applications of the resin.

(i) The content of the elastomer-component, (ii) the molecular weight of the resin component and (iii) the composition of the resin component are known to be factors influencing the environmental stress cracking of the elastomer-containing styrene resin. In order to improve the environmental stress cracking resistance, it has been proposed, for instance, (i) to increase the content of the elastomer component, (ii) to increase the molecular weight of the resin component and (iii) to increase the absolute value of the difference between the solubility parameter of the resin component and the solubility parameter of the chemical agent, or to increase the melt viscosity of the resin component by introducing bulky susbtituents to the polymer chain constituting the resin component. However, none of these proposals provides practically adequate effect for the improvement of the environmental stress cracking resistance.

The present inventors have previously reported that the environmental stress cracking resistance of an elastomer-containing styrene resin can remarkably be improved by incorporating an acrylate polymer to the elastomer-containing styrene resin (U.S. Pat. No. 4,533,698). While the composition of the previous invention provides a remarkable effect for the improvemeht of the environmental stress cracking resistance, a surface defect phenomenon has been sometimes observed on the surface of an injection molded product, and an improvement in this respect has been desired. Namely, when the composition of the previous invention has been subjected to injection molding, a mica-like lamellar peeling phenomenon has been sometimes observed in the vicinity of the gate of tne molded product, or an abnormal surface so-called a flow mark has been sometimes observed in the vicinity of the gate, whereby the outer appearance of the molded product has been seriously impaired. Such a surface defect phenomenon on the surface is believed to result when acrylate polymer particles which are non-uniformly dispersed in an elastomer-containing styrene resin undergo a flattening deformation by the shearing stress during the injection molding, and such a surface defect phenomenon appears frequently especially when an elastomer-containing styrene resin having a high melt viscosity is employed.

For the purpose of preventing the flattening deformation of the acrylate polymer particles, it is effective to copolymerize a polyfunctional vinyl monomer at the time of polymerization of the acrylate polymer.

However, in the case of an acrylate polymer obtained by copolymerizing a polyfunctional vinyl monomer such as divinyl benzene or ethylene glycol dimethacrylate, the gel content is high and the effect for the improvement of the environmental stress cracking resistance of the elastomer-containing styrene resin is inadequate, although the surface defect phenomenon can adequately be eliminated. It is possible to use a combination of a polyfunctional vinyl monomer and a chain transfer agent to produce an acrylate polymer having a low gel content and a branched structure, and thereby to prepare a composition capable of presenting a molded product having good environmental stress cracking resistance and having the surface defect phenomenon controlled to some extent. However, such effects have been inadequate from the practical point of view.

It is an object of the present invention to provide a thermoplastic resin composition having the above-mentioned drawbacks of the conventional technique solved.

In the first aspect, the present invention provides a polymer composition obtained by mixing, in an emulsion state, (A) from 20 to 90% by weight (as solid content of polymer) of an emulsion of polymer component (A) which is a polymer of a vinyl monomer and has a glass transition temperature of higher than 20° C., a gel content of not higher than 10% and a solubility parameter of from 8.0 to 11.0 $(cal/cc)^{\frac{1}{2}}$ and which has a weight average molecular weight, based on polystyrene, of at least $1.5 \times 10^5$, and (B) from 10 to 80% by weight (as solid content of polymer) of an emulsion of polymer component (B) which is a homopolymer of an acrylate monomer, a copolymer of acrylate monomers or a copolymer of an acrylate monomer with other copolymerizable monomer and has a glass transition temperature of not higher than 20° C., a gel content of not higher than 70% and a solubility parameter of from 8.4 to 9.8 $(cal/cc)^{\frac{1}{2}}$, and separating the polymer from the emulsion mixture.

In the second aspect, the present invention provides a thermoplastic resin composition comprising from 0.5 to 50% by weight of the polymer composition as defined above and from 50 to 99.5% by weight of an elastomer-containing styrene resin comprising an elastomer component and a resin component having a glass transition temperature of higher than 20° C., with a covalent substance of the elastomer and resin components being present at the interface between the elastomer component constituting a dispersed phase and the resin component constituting a continuous phase. This thermoplastic resin composition has excellent environmental stress cracking resistance and capable of presenting a molded product having an improved surface condition substantially free from the above-mentioned surface defect phenomenon such as a lamellar peeling phenomenon or flow marks.

The vinyl monomer for polymer component (A) of the present invention, includes an aromatic vinyl monomer such as styrene, α-methylstyrene, vinyl toluene, t-butylstyrene, cyanostyrene or chlorostyrene; a vinyl cyanide monomer such as acrylonitrile or methacrylonitrile; an acrylate monomer such as methyl acrylate, ethyl acrylate, butyl acrylate, hexyl acrylate, cyclohexyl acrylate, octyl acrylate, decyl acrylate, octadecyl acrylate, hydroxyethyl acrylate, methoxyethyl acrylate, glycidyl acrylate or phenyl acrylate; a methacrylate monomer such as methyl methacrylate, ethyl methacrylate, butyl methacrylate, hexyl methacrylate, cyclohexyl methacrylate, octyl methacrylate, decyl methacrylate, octadecyl methacrylate, hydroxyethyl methacrylate, methoxyethyl methacrylate, glycidyl methacrylate or phenyl methacrylate; an amide monomer such as acrylamide or methacrylamide; an unsaturated carboxylic acid monomer such as acrylic acid, methacrylic acid or itaconic acid; a vinyl halide monomer such as vinyl chloride or vinylidene chloride; an aliphatic vinyl ester monomer such as vinyl formate, vinyl acetate, vinyl propionate, vinyl decanate or vinyl octadecanate; an olefin monomer such as ethylene, propylene, 1-butene, isobutylene or 2-butene; a maleimide monomer such as maleimide, N-methyl maleimide, N-ethyl maleimide, N-propyl maleimide, N-cyclohexyl maleimide, N-phenyl maleimide or N-toluyl maleimide; an acid anhydride monomer such as maleic anhydride; a conjugated diene monomer such as butadiene, isoprene or chloroprene; a vinyl ether monomer such as methyl vinyl ether, ethyl vinyl ether, propyl vinyl ether, hexyl vinyl ether, decyl vinyl ether, octadecyl vinyl ether, phenyl vinyl ether, cresyl vinyl ether or glycidyl vinyl ether; a vinyl ketone monomer such as methyl vinyl ketone or phenyl vinyl ketone; and vinyl pyridine. However, the vinyl monomer is not restricted to these specific examples.

The vinyl monomer for polymer component (A) of the present invention may be a polyfunctional vinyl monomer. The polyfunctional vinyl monomer includes divinyl benzene, ethylene glycol di(meth)acrylate, 1,3-butylene glycol di(meth)acrylate, 1,4-butylene glycol di(meth)acrylate, propylene glycol di(meth)acrylate, triallyl cyanurate, triallyl isocyanurate, trimethylol propane tri(meth)acrylate, allyl (meth)acrylate, vinyl (meth)acrylate, a polyethylene glycol di(meth)acrylate, a polypropylene glycol di(meth)acrylate and 1,6-hexanediol di(meth)acrylate. Here, for example, ethylene glycol di(meth)acrylate represents ethylene glycol diacrylate or ethylene glycol dimethacrylate.

Polymer component (A) of the present invention is required to have a glass transition temperature of higher than 20° C. A preferred glass transition temperature is at least 30° C. If the glass transition temperature of polymer component (A) is not higher than 20° C., it is difficult to handle the polymer composition C prepared by mixing polymer component (A) and polymer component (B) in the form of a powder or pellets, and such is industrially disadvantageous. Further, when mixed with an elastomer-containing styrene resin, it tends to substantially lower the heat resistance, such being undesirable.

Polymer component (A) of the present invention is required to have a solubility parameter within a range of from 8.0 to 11.0 (cal/cc)$^{\frac{1}{2}}$. A preferred range is from 8.5 to 10.5 (cal/cc)$^{\frac{1}{2}}$. If the polymer composiion C prepared by mixing polymer component (A) with the solubility parameter being outside the range of the present invention with polymer component (B), is mixed with an elastomer-containing styrene resin to obtain a thermoplastic resin composition, a lamellar peeling phenomenon or a surface defect phenomenon such as a flow mark, is likely to appear on the molded product of the resin composition.

In this specification, the solubility parameter means the solubility parameter values described in Polymer Handbook, Vol. 2, IV-337 to IV-359, edited by J. Brandrup and E.H. Immergut and published in 1975 by John Wirry and Sons Co., New York, U.S.A. The solubility parameter $\delta_T$ of the copolymer is calculated in accordance with the following formula I:

$$\delta_T = \sum_{n=1}^{m} \delta_n W_n / \sum_{n=1}^{m} W_n [(cal/cc)^{\frac{1}{2}}] \quad [I]$$

wherein $67_n$ is the solubility parameter of the homopolymer of each vinyl monomer constituting the copolymer made of m types of vinyl monomers, and $W_n$ is the weight fraction.

For instance, if the solubility parameters of poly(butyl acrylate) and poly(ethyl acrylate) are 8.8 (cal/cc)$^{\frac{1}{2}}$ and 9.4 (cal/cc)$^{\frac{1}{2}}$, respectively, the solubility parameter of a copolymer comprising 70% by weight of polybutyl acrylate and 30% by weight of poly-ethyl acrylate is calculated to be 9.0 (cal/cc)$^{\frac{1}{2}}$.

Polymer component (A) of the present invention is required to have a weight average molecular weight, based on polystyrene, of at least $1.5 \times 10^5$, preferably at least $2 \times 10^5$. If the polymer composition C prepared by mixing polymer component (A) having a weight average molecular weight, based on polystyrene of less than $1.5 \times 10^5$, with polymer component (B), is mixed with the elastomer-containing styrene resin to obtain a thermoplastic resin composition, a lamellar peeling phenomenon or a surface defect phenomenon such as a flow mark tends to appear on the molded product prepared from such a composition, such being undesirable.

In this specification, the weight average molecular weight based on polystyrene means a weight average molecular weight obtained by gel permeation chromatography on the assumption that polymer component (A) is polystyrene. Namely, by using a polystyrene having a narrow molecular weight distribution and a known molecular weight as a standard substance, a calibration curve is prepared from the relation between the molecular weight and the elution peak volume of the gel permeation chromatogram. Then, the gel permeation chromatogram of polymer component (A) is measured, and the molecular weight is determined from the elution volume by means of the above calculation curve, and the weight average molecular weight is calculated in accordance with a usual method.

Polymer component (A) of the present invention is required to have a gel content of not higher than 10%.

In the present specification, the gel content is determined by accurately measuring the weight $S_0$ (g) of polymer component (A) of about 1.0 g, placing it in a cage made of a 400 mesh stainless steel net, immersing it in 100 g of methyl ethyl ketone at 5° C. for 24 hours, then after withdrawing the cage, air drying it at room temperature, measuring the weight $S_1$ (g) of the insoluble of component (A), and then calculating the gel content in accordance with the following formula II:

$$(S_1/S_0) \times 100 \, (\%) \quad [II]$$

If the gel content of polymer component (A) exceeds 10%, a molded product of a composition obtained by mixing a polymer composition C comprising such polymer component (A) and polymer component (B) with an elastomer-containing styrene resin, tends to be inferior in the gloss, such being undesirable.

There is no particular restriction as to the method for the preparation of polymer component (A) of the present invention. Conventional methods such as emulsion polymerization, suspension polymerization, solution polymerization and bulk polymerization, may suitably be employed. Emulsion polymerization is industrially most advantageous, because according to the present invention, polymer component (A) and polymer component (B) are mixed in an emulsion state, and according to the emulsion polymerization, a polymer having a high molecular weight can easily be produced on an industrial scale.

For the preparation of polymer component (A) of the present invention, the vinyl monomer may be selected optionally so long as the glass transition temperature, the gel content, the solubility parameter and the weight average molecular weight of the resulting polymer component (A) satisfy the requirements of the present invention.

A chain transfer agent may be employed for the purpose of controlling the molecular weight of polymer component (A). In particular, in a case where a multifunctional vinyl monomer is copolymerized, it is possible to obtain polymer component (A) having a branched structure and a low gel content by using a chain transfer agent.

There is no particular restriction as to the chain transfer agent to be used. For instance, a sulfur compound such as octyl mercaptan, decyl mercaptan, thioglycolic acid, ethyl thioglycolate, butyl thioglycolate, ethyl o-mercaptobenzoate, 1-naphthyl disulfide or sulfur, a halogen compound such as carbon tetrabromide, a hydrocarbon such as limonene or terpinolene a nitro compound such as nitrophenol or trinitrobenzene, and benzoquinone, may be mentioned.

Polymer compcnent (B) of the present invention is a homopolymer of an acrylate monomer or a copolymer of acrylate monomers, or a copolymer of an acrylate monomer with other copolymerizable monomer. Here, specific examples of the acrylate monomer are the same as the specific examples of the acrylate monomer described hereinbefore as the specific examples of the vinyl monomer for component (A) of the present invention. Likewise, specific examples of said copolymerizable monomer for component (B) are the same as the specific examples disclosed hereinbefore as examples of the vinyl monomer for component (A) provided acrylate monomers are excluded. Especially when a polyethylene glycol mono(meth)acrylate or a polypropylene glycol mono(meth)acrylate is used in an amount of not more than 20% by weight relative to the total amount of the vinyl monomers consituting component (B), the above-mentioned lameller peeling phenomenon or the surface defect phenomenon such as a flow mark may effectively be suppressed. If the amount of the polyethylene glycol mono(meth)acrylate or the polypropylene glycol mono(meth)acrylate exceeds 20% by weight, the environmental stress cracking resistance tends to be poor, such being undesirable.

The polyethylene glycol mono(meth)acrylate or the polypropylene glycol mono(meth)acrylate used in the present invention, is represented by the formula III, which includes diethylene glycol monomethacrylate, methoxytetraethylene glycol monomethacrylate, octapropylene glycol monoacrylate and phenoxydecaethylene glycol monoacrylate.

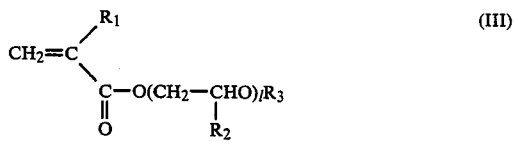

wherein $R_1$ is a hydrogen atom or a methyl group, $R_2$ which may be the same or different from each other is a hydrogen atom or a methyl group, $R_3$ is $C_mH_{2m+1}$ wherein m is an integer of at least 0, or

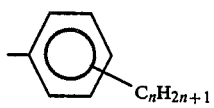

wherein n is an integer of at least 0, and l is an integer of at least 2. In a case where polymer component (B) is prepared by emulsion polymerization, it is preferred to conduct the polymerization so that the polyethylene glycol mono(meth)acrylate or polypropylene glyccimono(meth)acrylate residues have a concentration gradient in the cross-sectional direction of the polymer particles such that a greater amount of said residues are distributed in the vicinity of the surface of the particles. Such polymerization may be conducted by a method wherein such a monomer is added to the polymerization system concentratively towards the end of the polymerization reaction. Otherwise, an emulsion polymerization technique known as seeding polymerization may be employed.

For the polymerization of polymer component (B) of the present invention, a polyfunctional vinyl monomer or a chain transfer agent may also be employed. Specific examples of the polyfunctional vinyl monomer and the chain transfer agent may be the same as the specific examples given hereinbefore with respect to polymer component (A).

Polymer component (B) of the present invention is required to have a glass transition temperature of not higher than 20° C., preferably not higher than 10° C. If the glass transition temperature of polymer component (B) exceeds 20° C., the environmental stress cracking resistance of a composition obtained by mixing a polymer composition C comprising such polymer component (B) and polymer component (A) with an elastomer-containing styrene resin, tends to be inferior, such being undesirable.

Further, polymer component (B) of the present invention is required to have a gel content of not higher than 70%. The method for measuring the gel content is the same as that for polymer component (A) except that 100 g of toluene is used as the solvent instead of 100 g of methyl ethyl ketone, and the gel content is calculated in accordance with the above-mentioned formula II. If a polymer composition C obtained by mixing, in an emulsion state, polymer component (B) having a gel content of higher than 70% with polymer component (A), is mixed with an elastomer-containing styrene resin to obtain a resin composition, the environmental stress cracking resistance of the resin composition tends to be inferior, such being undesirable.

Polymer component (B) of the present invention is required to have a solubility parameter within a range of from 8.4 to 9.8 (cal/cc)$^{\frac{1}{2}}$, preferably within a range of from 8.6 to 9.6 (cal/cc)$^{\frac{1}{2}}$. The method for determining the solubility parameter is the same as described with respect to polymer component (A), and the solubility parameter is calculated in accordance with the above-mentioned formula I. If the solubility parameter of polymer component (B) is less than 8.4 (cal/cc)$^{\frac{1}{2}}$ or more than 9.8 (cal/cc)$^{\frac{1}{2}}$, the environmental stress cracking resistance of a resin composition obtained by mixing a polymer composition C comprising such polymer component (B) and polymer component (A), with an elastomer-containing styrene resin, tend to be inferior, such being undesirable.

There is no particular restriction as the method for the preparation of polymer component (B), and conventional methods such as emulsion polymerization, suspension polymerization, solution polymerization and bulk polymerization, may suitably be employed. However, emulsion polymerization is industrially most advantageous.

For the preparation of polymer component (B), the selection of the acrylate monomer, or the selection of the copolymerizable monomer, is optional so long as the glass transition temperature, the gel content and the solubility parameter of polymer component (B) satisfy the requirements of the present invention.

According to the present invention, from 20 to 90% by weight, preferably from 40 to 80% by weight, of polymer component (A) and from 10 to 80% by weight, preferably from 20 to 60% by weight, of polymer component (B) are mixed in an emulsion state to obtain a polymer composition C. If the content of polymer component (B) is less than 10% by weight, the environmetal stress cracking resistance of a composition obtained by mixing the polymer composition C with the elastomer-containing styrene resin, tends to be inferior. If it exceeds 80% by weight, a lamellar peeling phenomenon or a surface defect phenomenon such as a flow mark tends to appear on the molded product prepared from such a resin composition.

According to the present invention, an emulsion of polymer component (A) and an emulsion of polymer component (B) are mixed in an emulsion state. According to this method, uniform mixing of polymer component (A) with polymer component (B) can industrially most advantageously be accomplished. With a molded product of a thermoplastic resin composition obtained by mixing the polymer composition C thus obtained, with the elastomer-containing styrene resin, the lamellar peeling phenomenon and the surface defect phenomenon such as a flow mark, are substantially controlled. This is believed attributable to the fact that uniform dispersion of polymer component (B) in the resin composition has been accomplished.

When polymer component (A) or polymer component (B) is produced by emulsion polymerization, the polymerization solution obtained by the emulsion polymerization can be used by itself. If they are produced by other polymerization methods, a step of emulsifying such polymers is required.

There is no particular restriction as to the method for emulsifying the polymers, and any conventional method may be employed. For instance, there may be mentioned a method wherein a polymer solution is mixed with an emulsifier and water and stirred to obtain an emulsion, followed by removing the solvent, a method wherein a fine powder obtained by pulverizing a polymer is mixed and stirred together with an emulsifier and water to obtain an emulsion, or a method wherein a polymer is pulverized in the presence of an emulsifier and water to obtain an emulsion. The emulsifying method is not restricted to these specific examples.

There is no particular restriction as to the particle size of the polymer in the emulsion of component (A) or of component (B). However, the surface area average particle size is preferably not larger than 5 $\mu$m. Here, the surface area average particle size is obtained by taking an electron microscopic photograph of the emulsion and calculating it in accordance with the following formula IV on the basis that the ratio of a particle size $d_1$ is $f_i$.

$$\Sigma f_i d_i^3 / \Sigma f_i d_i^2 \qquad [IV]$$

If the surface area average particle size of polymer component (B) exceeds 5 $\mu$m, when a polymer composition C obtained by mixing such polymer component (B) with polymer component (A), is mixed to the elastomer-containing styrene resin to obtain a thermoplastic resin composition, a lamellar peeling phenomenon or a flow mark is likely to appear on a molded product of such thermoplastic resin composition.

There is no particular restriction to the type of the emulsifier to be used for the emulsion polymerization for polymer component (A) or for polymer component (B), or to be used for emulsification of the polymers. An anionic surfactant, a cationic surfactant, an amphoteric surfactant or a nonionic surfactant may optionally be employed. However, the anionic surfactant may most advantageously be used.

There is no particular restriction as to the method for mixing the emulsion of polymer component (A) and the emulsion of polymer component (B). The mixing may be conducted by using an apparatus such as a fixed container-type mixing apparatus, a rotary container-type mixing apparatus, a pipe line mixer or a static mixer.

There is no particular restriction as to the method for separating the polymer composition C from the emulsion mixture comprising the emulsion of polymer component (A) and the emulsion of polymer component (B). There may be mentioned a method wherein a precipitating agent e.g. an acid such as hydrochloric acid, sulfuric acid, phosphoric acid or acetic acid; an electrolyte such as sodium chloride, potassium chloride, aluminum chloride, sodium sulfate or magnesium sulfate; or a water soluble polymer such as a polyvinyl alcohol, a polyethylene glycol, a polyethylene glycol-polypropylene glycol block copolymer or a carboxymethyl cellulose, is added to the emulsion, a method wherein the emulsion is freezed for demulsification, or a method wherein the emulsion is sprayed in a high temperature gas.

The polymer composition C separated from the mixture of the emulsion of polymer component (A) and the emulsion of polymer component (B), may be supplied to a melt-kneading apparatus for melt-kneading. The melt-kneading apparatus to be employed, includes a Banbury mixer, an intensive mixer, a mixtruder, a co-kneader, an extruder and rolls. Further, it is possible to employ a melt-kneading apparatus having a dehydration mechanism, as disclosed in Japanese Examined Patent Publication No. 37021/1984. If this apparatus is employed, the emulsion and the precipitating agent may continuously be supplied to this apparatus, and the mixing, demulsification, dehydration, drying and melt-kneading may continuously be conducted in the same apparatus.

When added to a thermoplastic resin which is poor in the environmental stress cracking resistance, such as a polystyrene resin, a poly(styrene-acrylonitrile)resin, an acryl resin, a polyvinyl chloride resin, a polycarbonate resin or a polyphenylene oxide resin, the polymer composition C of the present invention effectively improves the environmental stress cracking resistance. However, when used in admixture with an elastomer-containing styrene resin, the polymer composition C of the present invention is particularly practically effective.

The elastomer-containing styrene resin to be used in the present invention comprises an elastomer component and a resin component having a glass transition temperature of higher than 20° C., and a covalent substance of the elastomer and resin components is present at the interface between the elastomer component constituting a dispersed phase and the resin component constituting a continuous phase.

The monomer constituting the elastomer component of the elastomer-containing styrene resin in the present invention, includes a conjugated diene monomer such as butadiene, isoprene, dimethylbutadiene, chloroprene or cyclopentadiene; a non-conjugated diene such as 2,5-norbornadiene, 1,4-cyclohexadiene or 4-ethylidenenorbornene; an aromatic vinyl monomer such as styrene, α-methylstyrene or vinyl toluene; a vinyl cyanide monomer such as acrylonitrile or methacrylonitrile; a (meth)acrylate monomer such as methyl methacrylate, ethyl acrylate, butyl acrylate, hexyl acrylate or octyl acrylate; and an olefin monomer such as ethylene, propylene, 1-butene, isobutylene or 2-butene. These monomers may be homopolymerized or copolymerized for use. Further, a copolymer obtained by copolymerizing a polyfunctional monomer as a crosslinking monomer, may also be employed. The polyfunctional vinyl monomer to be employed for such a copolymer includes divinyl benenze, ethylene glycol dimethacrylate, 1,3-butylene glycol dimethacrylate, 1,4-butylene glycol dimethacrylate, propylene glycol dimethacrylate, triallyl cyanurate, triallyl isocyanurate, trimethylolpropane trimethacrylate, allyl acrylate, allyl methacrylate, vinyl acrylate, vinylmethacrylate, glycidyl acrylate and glycidyl methacrylate.

The elastomer component to be employed for the elastomer-containing styrene resin of the present invention, is required to have graft sites. Specifically, it preferably has carbon-carbon double bonds in the elastomer molecule.

There is no particular restriction as to the method for the polymerization of the above monomers. A known method such as emulsion polymerization or solution polymerization may be employed.

The elastomer component for the elastomer-containing styrene resin may not necessarily be composed of a single kind, and may be a mixture of two or more elastomer components separately polymerized.

The monomer constituting the resin component of the elastomer-containing styrene resin in the present invention, includes an aromatic vinyl monomer such as styrene, α-methylstyrene, vinyl toluene or t-butylstyrene; a vinyl cyanide monomer such as acrylonitrile or methacrylonitrile; a (meth)acrylate monomer such as methyl methacrylate, ethyl acrylate, butyl acrylate, hexyl acrylate or octyl acrylate; and a maleimide monomer such as maleimide, N-methylmaleimide, N-ethylmaleimide, N-propylmaleimide, N-cyclohexylmaleimide, N-phenylmaleimide, N-toluylmaleimide or N-xylylmaleimide. These monomers may be homopolymerized or copolymerized for use. However, it is essential to contain an aromatic vinyl monomer.

The elastomer-containing styrene resin used in the present invention comprises the elastomer component and the resin component as described above. Further, it is essential that the covalent substance of the elastomer and resin components, which may be called a graft structure, is present at the interface between the elastomer component constituting a dispersed phase and the resin component constituting a continuous phase. It is known that such a structure is formed by a so-called graft polymerization method in which a part or whole of the monomer for the resin component is polymerized in the presence of an elastomer component. Likewise, the elastomer-containing styrene resin of the present invention can be produced by a conventional graft polymerization technique.

The resin component for the elastomer-containing styrene resin is required to have a glass transition temperature of higher than 20° C. If the glass transition temperature of the resin component is not higher than 20° C., the heat resistance or the rigidity of the thermoplastic resin composition tends to be low, such being undesirable.

The elastomer-containing styrene resin comprises the elastomer component and the resin component, as mentioned above, and it may be prepared by mixing a separately polymerized resin component to an elastomer-containing styrene resin obtained by polymerizing a monomer for the resin component in the presence of the elastomer component. Here, the separately polymerized resin component means a polymer of a vinyl monomer polymerized separately, and the vinyl monomer may be any one of the group of monomers as presented above as the monomer constituting the resin component for the elastomer-containing styrene resin. However, it should be noted here that the separately polymerized resin component may not necessarily have the same composition as the resin component obtained by the graft polymerization. For instance, a resin component obtained by copolymerizing acrylonitrile, styrene and α-methylstyrene may be mixed to an elastomer-containing styrene resin obtained by graft-polymerizing acrylonitrile, styrene and methyl methacrylate in the presence of a polybutadiene.

The separately polymerized resin component to be mixed to the elastomer-containing styrene resin, is required to have a glass transition temperature of higher than 20° C. If the glass transition temperature is not higher than 20° C., the heat resistance or the rigidity of the thermoplastic resin composition tends to be low.

Specific examples of the elastomer-containing styrene resin of the present invention, include a high impact polystyrene (butadiene-styrene) resin, an ABS (acrylonitrile-butadiene-styrene) resin, a heat resistant ABS (acrylonitrile-butadiene-styrene-α-methylstyrene) resin, an AAS (acrylonitrile-acrylate-styrene) resin, an AES (acrylonitrile-ethylene-propylene-styrene) resin and a MBAS (methyl methacrylate-butadiene-acrylonitrilestyrene) resin.

According to the present invention, from 0.5 to 50% by weight of the polymer composition C and from 50 to 99.5% by weight of the elastomer-containing styrene resin are mixed to obtain a thermoplastic resin composition. Preferably, from 2 to 40% by weight of the polymer composition C and from 60 to 98% by weight of the elastomer-containing styrene resin are mixed. If the amount of the polymer composition C is less than 0.5% by weight, the resulting thermoplastic resin composition tends to have poor environmental stress cracking resistance, and if it exceeds 50% by weight, the rigidity, the heat resistance or the impact resistance of the composition tends to be inferior.

There is no particular restriction as to the method for mixing the polymer composition C and the elastomer-containing styrene resin, and the two components may be mixed in the form of powders or pellets to obtain the desired thermoplastic resin composition. As the mixing apparatus, there may be mentioned a fixed container-type mixing apparatus such as a Henschel mixer, and a rotary container-type mixing apparatus such as a V-type blender or a tumbler. However, the mixing apparatus is not restricted to such specific examples. As the method for mixing the polymer composition C and the elastomer-containing styrene resin, there may be mentioned a melt-kneading. Specific examples of the melt-kneading apparatus to be employed, include a Banbury mixer, an intensive mixer, a mixtruder, a co-kneader, an extruder and rolls.

It is known to employ an elastomer-containing styrene resin in a blend with a different resin such as a polyphenylene oxide resin, a polyamide resin, a polysulfone resin, a polyester resin, a polycarbonate resin or a polyvinyl chloride resin. The thermoplastic resin composition of the present invention may also be used in a blend with such a different resin.

Now, the present invention will be described in further detail with reference to Examples. However, it should be understood that the present invention is by no means restricted to these specific Examples. In the following Examples, "parts" and "%" means "parts by weight" and "% by weight", respectively.

EXAMPLE 1 and COMPARATIVE EXAMPLE 1

Preparation of component (A): Preparation of A-1 to A-18 and A-23

Into an autoclave, 150 parts of pure water and 2 parts of potassium stearate were charged and heated to 50° C. under stirring. An aqueous solution obtained by dissolving 0.005 part of ferric sulfate heptahydrate, 0.01 part of tetrasodium ethylenediamine tetraacetate dihydrate and 0.3 part of sodium formaldehyde sulfoxylate dihydrate in 10 parts of pure water, was poured thereto.

Then, 100 parts of a monomer mixture having a composition as shown in Table 1, was continuously added over a period of 4 hours. At the same time, an aqueous solution obtained by dissolving 0.05 part of potassium persulfate in 25 parts of pure water, was continuously added over a period of 6 hours.

After the completion of the addition of the monomer mixture, 0.1 part of diisopropylbenzene hydroperoxide was added, and the system was heated to 70° C. and further stirred for 2 hours to complete the polymerization.

The characteristics of component (A) thus obtained, are shown in Table 2.

Preparation of component (A): Preoaration of A-19 to A-21

Into an autoclave, 175 parts of pure water and 2 parts of potassium stearate were charged, and heated to 70° C. under stirring.

An aqueous solution obtained by dissolving 0.05 part of potassium persulfate in 10 parts of pure water, was poured thereto, and 100 parts of a monomer mixture having a composition as shown in Table 1, was continuously added thereto over a period of 4 hours.

After the completion of the addition of the monomer mixture, 0.1 part of lauroyl peroxide was added, and the reaction system was stirred at 70° C. for further 2 hours to complete the polymerization.

The characteristics of component (A) thus obtained are shown in Table 2.

Preparation of component (A): Preparation of A-22

Into an autoclave, 175 parts of pure water and 2 parts of potassium stearate were charged, and heated to 50° C. under stirring. An aqueous solution obtained by dissolving 0.005 part of ferric sulfate heptahydrate, 0.01 part of tetrasodium ethylenediamine tetraacetate dihydrate and 0.3 part of sodium formaldehyde sulfoxylate dihydrate in 10 parts of pure water, was poured thereto.

Then, a solution mixture obtained by dissolving 0.2 part of diisopropylbenzene hydroperoxide in 100 parts of a monomer mixture having a composition as shown in Table 1, was continuously added over a period of 5 hours.

After the completion of the addition of the monomer mixture, 0.1 part of diisopropylbenzene hydroperoxide was added, and the system was heated to 70° C. and stirred for further 2 hours to complete the polymerization.

The characteristics of component (A) thus obtained are shown in Table 2.

Preparation of component (B): Except for B-15 and B-27

Into an autoclave, 120 parts of pure water and 2 parts of sodium dodecylbenzene sulfonate were charged, and heated to 65° C. under stirring. An aqueous solution obtained by dissolving 0.005 part of ferric sulfate heptahydrate, 0.01 part of tetrasodium ethylenediamine tetraacetate dihydrate and 0.3 part of sodium formaldehyde sulfoxylate dihydrate in 10 parts of pure water, was poured thereto.

Then, 20% of 100 parts of the monomer mixture having a composition as shown in Table 3, was poured into the autoclave, and 2.5 parts of an aqueous solution containing 0.2% of potassium persulfate was added to initiate the polymerization.

When the polymerization started, the rest of the above-mentioned monomer mixture was continuously added over a period of 4 hours. Further, when the polymerization started, an aqueous solution obtained by dissolving 0.05 part of potassium persulfate in 20 parts of pure water, was continuously added over a period of 6 hours. After the completion of the addition of the aqueous potassium persulfate solution, the content of the autoclave was cooled to complete the polymerization.

The characteristics of component (B) thus obtained are shown in Table 4.

Preparation of component (B): Preparation of B-15 and B27

Into an autoclave, 140 parts of pure water and 2 parts of sodium dodecylbenzene sulfonate were charged, and heated to 70° C. under stirring.

An aqueous solution obtained by dissolving 0.05 part of potassium persulfate in 10 parts of pure water, was poured thereto, and 100 parts of a monomer mixture having a composition as identified in Table 3, was continuously added thereto over a period of 4 hours.

After the completion of the addition of the monomer mixture, 0.1 part of diisopropylbenzene hydroperoxide was added, and the system was stirred for further 2 hours at 70° C. to complete the polymerization.

The characteristics of component (B) thus obtained are shown in Table 4.

The abbreviations for the long chain monomers used in Table 3 are as follows:
9G: Nonaethylene glycol dimethacrylate
14G: Tetradecaethylene glycol dimethacrylate
9PG: Nonapropylene glycol dimethacrylate
M4GM: Methoxytetraethylene glycol monomethacrylate Preparation of polymer composition C 50 parts (as solid content of polymer) of an emulsion of component (A) and 50 parts (as solid content of polymer) of an emulsion of component (B) were mixed in an emulsion state, and a 10% aqueous solution of 0.7 part of a polyethylene glycol-polypropylene glycol block copolymer (weight ratio of ethylene oxide in the total molecules: 80%, the molecular weight of polypropylene glycol: 1750, Pluronic F-68, manufactured by Asahi Denka Kogyo K.K.) was added thereto.

An aqueous solution obtained by dissolving 5 parts of calcium chloride dihydrate in 400 parts of pure water, was heated to from 80° to 95° C. and the above emulsion mixture was poured thereto under stirring for precipitation.

The slurry thus obtained was filtered, washed with water and dried in an atmosphere of 70° C. to obtain a polymer composition C.

The physical property values were obtained in accordance with the following methods.

(1) Glass transition temperature

A solid obtained by dropping an emulsion of component (A) or (B) into methanol, was dried, and the glass transition temperature was measured by 910 differential scanning calorimeter and 990 thermal analyzer i.e. DuPont's system measuring devices.

(2) Gel content

A solid obtained by dropping an emulsion of component (A) or (B) into methanol, was dried. About 1.0 g thereof was accurately weighed. The measurements were conducted in the above disclosed method and calculated in accordance with the formula II. However, the solvent used was different as between component (A) and component (B). Namely, methyl ethyl ketone was used for component (A), whereas toluene was used for component (B).

(3) Solubility parameter

The solubility parameter values [unit: $(cal/cc)^{\frac{1}{2}}$] of the polymers used for the calculation of the solubility parameters in the Examples, were as follows.

| | |
|---|---|
| Poly(butyl acrylate): | 8.8 |
| Poly(ethyl acrylate): | 9.4 |
| Poly(methyl methacrylate): | 9.5 |
| Polyacrylonitrile: | 12.5 |
| Polystyrene: | 9.1 |
| Poly(vinyl toluene): | 8.9 |
| Poly(t-butylstyrene): | 7.9 |

(4) Weight average molecular weight

Two GMH-6 type columns manufactured by Toyo Soda Manufacturing Co., Ltd., were connected in series to HLC-802A type gel permeation chromatography manufactured by Toyo Soda Manufacturing Co., Ltd., and the measurement was conducted. As the detector, a refractometer was used, and as the solvent, tetrahydrofuran was used. When this apparatus is used, the upper limit for the measurement of the weight average molecular weight is $6 \times 10^5$, and a sample having an weight average molecular weight exceeding $6 \times 10^5$ was indicated by $>6$ in Table 1.

As the sample, a solid obtained by precipitating an emulsion of component (A) in methanol, was employed.

TABLE 1

| Sample No. | Styrene (parts) | Acrylonitrile (parts) | Methyl methacrylate (parts) | Vinyl toluene (parts) | t-Butyl-styrene (parts) | n-Butyl acrylate (parts) | Ethyl acrylate (parts) | Ethylene glycol dimethacrylate (parts) | t-Dodecyl mercaptan (parts) |
|---|---|---|---|---|---|---|---|---|---|
| A-1 | 75 | 25 | 0 | 0 | 0 | 0 | 0 | 0 | 0 |
| A-2 | 75 | 25 | 0 | 0 | 0 | 0 | 0 | 0 | 0.05 |
| A-3 | 75 | 25 | 0 | 0 | 0 | 0 | 0 | 0 | 0.20 |
| A-4 | 75 | 25 | 0 | 0 | 0 | 0 | 0 | 0 | 0.40 |
| A-5 | 65 | 35 | 0 | 0 | 0 | 0 | 0 | 0 | 0 |
| A-6 | 0 | 30 | 70 | 0 | 0 | 0 | 0 | 0 | 0 |
| A-7 | 0 | 20 | 80 | 0 | 0 | 0 | 0 | 0 | 0 |
| A-8 | 0 | 10 | 90 | 0 | 0 | 0 | 0 | 0 | 0 |
| A-9 | 0 | 5 | 95 | 0 | 0 | 0 | 0 | 0 | 0 |
| A-10 | 0 | 30 | 0 | 70 | 0 | 0 | 0 | 0 | 0 |
| A-11 | 0 | 30 | 0 | 0 | 70 | 0 | 0 | 0 | 0 |
| A-12 | 35 | 30 | 0 | 0 | 0 | 35 | 0 | 0 | 0 |
| A-13 | 35 | 30 | 0 | 0 | 0 | 0 | 35 | 0 | 0 |
| A-14 | 75 | 25 | 0 | 0 | 0 | 0 | 0 | 0.10 | 0.10 |
| A-15 | 0 | 20 | 30 | 0 | 0 | 50 | 0 | 0 | 0 |
| A-16 | 75 | 25 | 0 | 0 | 0 | 0 | 0 | 0 | 0.50 |
| A-17 | 75 | 25 | 0 | 0 | 0 | 0 | 0 | 0 | 1.0 |
| A-18 | 0 | 55 | 45 | 0 | 0 | 0 | 0 | 0 | 0 |

TABLE 1-continued

| Sample No. | Styrene (parts) | Acrylonitrile (parts) | Methyl methacrylate (parts) | Vinyl toluene (parts) | t-Butyl-styrene (parts) | n-Butyl acrylate (parts) | Ethyl acrylate (parts) | Ethylene glycol dimethacrylate (parts) | t-Dodecyl mercaptan (parts) |
|---|---|---|---|---|---|---|---|---|---|
| A-19 | 75 | 25 | 0 | 0 | 0 | 0 | 0 | 1.0 | 0 |
| A-20 | 75 | 25 | 0 | 0 | 0 | 0 | 0 | 0 | 0 |
| A-21 | 75 | 25 | 0 | 0 | 0 | 0 | 0 | 0 | 0.05 |
| A-22 | 75 | 25 | 0 | 0 | 0 | 0 | 0 | 0 | 0 |
| A-23 | 100 | 0 | 0 | 0 | 0 | 0 | 0 | 0 | 0 |

TABLE 2

| Sample No. | Glass transition temperature (°C.) | Gel content (%) | Solubility parameter $(cal/cc)^{\frac{1}{2}}$ | Weight average molecular weight ($\times 10^5$) |
|---|---|---|---|---|
| A-1 | 106 | 0 | 10.0 | >6 |
| A-2 | 105 | 0 | 10.0 | 3.5 |
| A-3 | 105 | 0 | 10.0 | 2.2 |
| A-4 | 105 | 0 | 10.0 | 1.5 |
| A-5 | 106 | 0 | 10.3 | >6 |
| A-6 | 84 | 0 | 10.4 | >6 |
| A-7 | 89 | 0 | 10.1 | >6 |
| A-8 | 96 | 0 | 9.8 | 5.2 |
| A-9 | 103 | 0 | 9.7 | 5.0 |
| A-10 | 113 | 0 | 10.0 | >6 |
| A-11 | 127 | 0 | 9.3 | >6 |
| A-12 | 38 | 0 | 10.0 | >6 |
| A-13 | 66 | 0 | 10.2 | >6 |
| A-14 | 106 | 0 | 10.0 | >6 |
| A-15 | 4 | 0 | 9.8 | >6 |
| A-16 | 104 | 0 | 10.0 | 1.1 |
| A-17 | 103 | 0 | 10.0 | 0.58 |
| A-18 | 72 | 0 | 11.2 | >6 |
| A-19 | 106 | 94 | 10.0 | Not measurable |
| A-20 | 105 | 0 | 10.0 | >6 |
| A-21 | 105 | 0 | 10.0 | 3.7 |
| A-22 | 106 | 0 | 10.0 | 3.0 |
| A-23 | 105 | 0 | 9.1 | >6 |

TABLE 4

| Sample No. | Glass transition temperature (°C.) | Gel content (%) | Solubility parameter $(cal/cc)^{\frac{1}{2}}$ |
|---|---|---|---|
| B-1 | −18 | 0.15 | 9.0 |
| B-2 | −19 | 0.10 | 9.0 |
| B-3 | −18 | 0.63 | 9.0 |
| B-4 | −18 | 0.93 | 9.0 |
| B-5 | −19 | 0.79 | 9.0 |
| B-6 | −18 | 0.31 | 9.0 |
| B-7 | −18 | 0.19 | 9.0 |
| B-8 | −19 | 0.77 | 9.0 |
| B-9 | −12 | 2.67 | 9.2 |
| B-10 | −10 | 4.57 | 9.6 |
| B-11 | −12 | 0.84 | 8.9 |
| B-12 | −6 | 0.46 | 8.9 |
| B-13 | 1 | 1.12 | 8.9 |
| B-14 | 4 | 0.94 | 9.2 |
| B-15 | −16 | 47 | 9.0 |
| B-16 | −17 | 0.70 | 9.1 |
| B-17 | −16 | 0.48 | 9.1 |
| B-18 | −16 | 0.39 | 9.1 |
| B-19 | −17 | 0.99 | 9.1 |
| B-20 | −15 | 0.86 | 9.2 |
| B-21 | −15 | 0.62 | 9.3 |
| B-22 | −13 | 1.59 | 9.5 |
| B-23 | −47 | 0.13 | 8.8 |
| B-24 | −17 | 0.73 | 9.4 |
| B-25 | 52 | 3.07 | 9.3 |
| B-26 | −8 | 19.8 | 9.9 |
| B-27 | −18 | 82 | 9.0 |

TABLE 3

| Sample No. | n-Butyl acrylate (parts) | Ethyl acrylate (parts) | Methyl methacrylate (parts) | Acrylo-nitrile (parts) | Styrene (parts) | t-Dodecyl mercaptan (parts) | Ethylene glycol dimethacrylate (parts) | Type of long chain monomer | Amount of long chain monomer (parts) |
|---|---|---|---|---|---|---|---|---|---|
| B-1 | 70 | 0 | 30 | 0 | 0 | 0 | 0 | Nil | 0 |
| B-2 | 70 | 0 | 30 | 0 | 0 | 0.1 | 0 | Nil | 0 |
| B-3 | 70 | 0 | 30 | 0 | 0 | 0.1 | 0.1 | Nil | 0 |
| B-4 | 70 | 0 | 30 | 0 | 0 | 0 | 0 | 9G | 0.5 |
| B-5 | 70 | 0 | 30 | 0 | 0 | 0 | 0 | 14G | 1.0 |
| B-6 | 70 | 0 | 30 | 0 | 0 | 0 | 0 | 9PG | 0.5 |
| B-7 | 70 | 0 | 30 | 0 | 0 | 0.1 | 0.1 | 9PG | 0.75 |
| B-8 | 70 | 0 | 30 | 0 | 0 | 0.1 | 0.1 | M4GM | 5.0 |
| B-9 | 70 | 0 | 24 | 6 | 0 | 0 | 0 | Nil | 0 |
| B-10 | 70 | 0 | 10 | 20 | 0 | 0 | 0 | Nil | 0 |
| B-11 | 70 | 0 | 10 | 0 | 20 | 0 | 0 | Nil | 0 |
| B-12 | 70 | 0 | 0 | 0 | 30 | 0 | 0 | Nil | 0 |
| B-13 | 60 | 0 | 0 | 0 | 40 | 0 | 0 | Nil | 0 |
| B-14 | 50 | 0 | 50 | 0 | 0 | 0 | 0 | Nil | 0 |
| B-15 | 70 | 0 | 30 | 0 | 0 | 0 | 0.37 | 9PG | 1.0 |
| B-16 | 50 | 50 | 0 | 0 | 0 | 0 | 0 | Nil | 0 |
| B-17 | 50 | 50 | 0 | 0 | 0 | 0 | 0.1 | Nil | 0 |
| B-18 | 50 | 50 | 0 | 0 | 0 | 0.1 | 0.1 | Nil | 0 |
| B-19 | 50 | 50 | 0 | 0 | 0 | 0.1 | 0.1 | M4GM | 5.0 |
| B-20 | 40 | 60 | 0 | 0 | 0 | 0 | 0 | Nil | 0 |
| B-21 | 20 | 80 | 0 | 0 | 0 | 0 | 0 | Nil | 0 |
| B-22 | 20 | 74 | 0 | 6 | 0 | 0 | 0 | Nil | 0 |
| B-23 | 100 | 0 | 0 | 0 | 0 | 0 | 0 | Nil | 0 |
| B-24 | 0 | 100 | 0 | 0 | 0 | 0 | 0 | Nil | 0 |
| B-25 | 30 | 0 | 70 | 0 | 0 | 0 | 0 | Nil | 0 |
| B-26 | 70 | 0 | 0 | 30 | 0 | 0 | 0 | Nil | 0 |
| B-27 | 70 | 0 | 30 | 0 | 0 | 0 | 0.5 | Nil | 0 |
| B-28 | 70 | 0 | 30 | 0 | 0 | 0 | 0.5 | Nil | 0 |

TABLE 4-continued

| Sample No. | Characteristics | | |
|---|---|---|---|
| | Glass transition temperature (°C.) | Gel content (%) | Solubility parameter $(cal/cc)^{\frac{1}{2}}$ |
| B-28 | −18 | 6.10 | 9.0 |

Preparation of thermoplastic resin composition 30 parts of an ABS resin powder comprising 50% of polybutadiene, 13% of acrylonitrile and 37% of styrene, 54 parts of an AS resin powder (weight average molecular weight based on polystyrene: $1.1 \times 10^5$) comprising 30% of acrylonitrile and 70% of styrene and 0.2 part of 4,4'-isopropylidene bis[monophenyl-dialkyl($C_{12}$–$C_{15}$) phosphite](Mark 1500, manufactured by Adeca Argus Kagaku K.K.), were mixed together with 16 parts of polymer composition C by a Henschel mixer, and supplied to a single screw extruder with a vent (VC-40 manufactured by K.K. Chuo Kikai Seisakusho) to obtain pellets.

A molded product was prepared by using the pellets thus obtained, and the physical properties were evaluated. The results are shown by Test Nos. 1 to 49 in Table 5.

The measured values of the physical properties were obtained by the following methods.

(1) Tensile yield strength: ASTM D-638
(2) Izod impact strength: ASTM D-256
(3) Vicat softening point: JIS K-6870
(4) Chemical resistance (environmental stress cracking resistance)

An ASTM D-638 type I dumbbell was fixed to jigs with a deflection of 50 mm, and, after the application of ethylene glycol monoethyl ether, left at a temperature of 23° C., whereby the time till rupture was represented by minutes. In the Table, >300 means that no rupture was observed upon expiration of 300 minutes.

(5) Gloss

Pellets were injection-molded by IS-80 CN-V injection molding machine manufactured by Toshiba Kikai K.K. to obtain a molded sheet product of $50 \times 85 \times 3$ mm. The gate shape was a tab gate.

The molded product was subjected to the measurement of the gloss at an angle of incidence of 60° by means of a digital variable angle gloss meter Model UGV-4D, manufactured by Suga Shikenki K.K.

(6) Lamellar peeling and flow mark

A strip-shape molded product of $20 \times 80 \times 3$ mm was prepared by IS-80 CN-V injection molding machine manufactured by Toshiba Kikai K.K. The gate was located at a center of one side of a length of 20 mm, and the gate shape was an edge gate having a length of 2 mm and a rectangular cross section with 2 mm in the direction of the molded product and 1.5 mm in the direction of the thickness. The mold cavity was designed for four products.

When the gate portion of the molded product is broken by fingers, the portion around the gate may undergo lamellar peeling. The degree of the peeling was evaluated in comparison with a standard test sample as described hereinafter.

Likewise, a fan-shaped flow mark is likely to form around the gate of the molded product, and the degree of the flow mark was evaluated in comparison with a standard test sample as described below in the same manner as in the case of the lamellar peeling.

A: Not observed at all
B: Slightly observed
C: Substantially observed
D: Remarkably observed A ranking AB indicates that the evaluated level is inbetween ranking A and ranking B.

(7) Spiral flow (flowability)

As an index for the flowability, the flow length of the resin was measured when it was injection-molded under prescribed conditions in accordance with the following method.

Molding machine: Kawaguchi Charchil 1040S, manufactured by Kawaguchi Tekko K.K.
Mold: An Archimedes circle in its cross section obtained by equally dividing the ellipse having a major axis of 5.0 mm and a minor axis of 4.6 mm along the major axis.
Molding conditions:
 Injection pressure: 50 kg/cm$^2$G
 Cylinder temperature: 260° C. or 280° C.
 Mold temperature: 40° C.
Measuring method and evaluation: The length of the molded product from the gate portion to the free flow end was measured. The evaluation is made on the basis that the greater the flow length, the better the flowability.

TABLE 5

| Example or Comparative Example | Test No. | Component (A) | Component (B) | Tensile yield strength (kg/cm$^2$) | Izod impact strength (kg·cm/cm) | Chemical resistance (min) | Gloss (%) | Lamellar peeling | Flow mark | Vicat softening point (°C.) | Spiral flow (cm) |
|---|---|---|---|---|---|---|---|---|---|---|---|
| Example 1 | 1 | A-1 | B-3 | 430 | 26 | >300 | 92 | A | A | 97 | 32 |
| | 2 | A-2 | B-3 | 420 | 26 | >300 | 92 | A | AB | 97 | 34 |
| | 3 | A-3 | B-3 | 420 | 28 | 236 | 94 | A | B | 94 | 36 |
| | 4 | A-4 | B-3 | 420 | 27 | 197 | 95 | B | B | 94 | 36 |
| | 5 | A-5 | B-3 | 430 | 27 | >300 | 93 | A | A | 97 | 31 |
| | 6 | A-6 | B-3 | 410 | 34 | 195 | 90 | B | B | 91 | 35 |
| | 7 | A-7 | B-3 | 430 | 29 | >300 | 89 | A | A | 94 | 31 |
| | 8 | A-8 | B-3 | 430 | 28 | >300 | 90 | A | A | 95 | 32 |
| | 9 | A-9 | B-3 | 420 | 26 | >300 | 89 | AB | A | 97 | 32 |
| | 10 | A-10 | B-3 | 430 | 27 | 163 | 88 | AB | A | 98 | 30 |
| | 11 | A-11 | B-3 | 420 | 21 | 185 | 91 | A | A | 96 | 35 |
| | 12 | A-12 | B-3 | 420 | 27 | >300 | 90 | A | B | 93 | 34 |
| | 13 | A-13 | B-3 | 410 | 31 | >300 | 91 | A | A | 93 | 34 |
| | 14 | A-14 | B-3 | 420 | 29 | >300 | 77 | A | AB | 97 | 30 |
| | 15 | A-21 | B-3 | 430 | 27 | >300 | 92 | A | A | 97 | 32 |
| | 16 | A-22 | B-3 | 420 | 26 | >300 | 91 | A | AB | 94 | 34 |
| | 17 | A-23 | B-3 | 410 | 28 | >300 | 91 | A | AB | 94 | 36 |

TABLE 5-continued

| Example or Comparative Example | Test No. | Component | Component | Tensile yield strength (kg/cm²) | Izod impact strength (kg·cm/cm) | Chemical resistance (min) | Gloss (%) | Lamellar peeling | Flow mark | Vicat softening point (°C.) | Spiral flow (cm) |
|---|---|---|---|---|---|---|---|---|---|---|---|
| | 18 | A-1 | B-1 | 430 | 27 | >300 | 90 | A | A | 97 | 32 |
| | 19 | A-1 | B-2 | 410 | 20 | >300 | 88 | A | A | 96 | 33 |
| | 20 | A-1 | B-4 | 420 | 28 | >300 | 92 | A | A | 97 | 32 |
| | 21 | A-1 | B-5 | 420 | 26 | >300 | 90 | A | A | 96 | 32 |
| | 22 | A-1 | B-6 | 430 | 26 | >300 | 91 | A | A | 97 | 32 |
| | 23 | A-1 | B-7 | 430 | 26 | >300 | 92 | A | A | 97 | 31 |
| | 24 | A-1 | B-8 | 430 | 28 | >300 | 92 | A | A | 97 | 33 |
| | 25 | A-1 | B-9 | 440 | 28 | 78 | 92 | A | A | 97 | 31 |
| | 26 | A-1 | B-10 | 460 | 24 | 21 | 93 | A | A | 98 | 32 |
| | 27 | A-1 | B-11 | 440 | 22 | >300 | 91 | A | A | 97 | 32 |
| | 28 | A-1 | B-12 | 450 | 21 | >300 | 92 | A | A | 96 | 32 |
| | 29 | A-1 | B-13 | 450 | 19 | >300 | 93 | A | A | 99 | 31 |
| | 30 | A-1 | B-14 | 460 | 12 | 188 | 91 | A | A | 98 | 32 |
| | 31 | A-1 | B-15 | 430 | 21 | 32 | 92 | A | A | 97 | 31 |
| | 32 | A-1 | B-16 | 430 | 28 | >300 | 91 | A | A | 97 | 32 |
| | 33 | A-1 | B-17 | 430 | 28 | >300 | 91 | A | A | 98 | 33 |
| | 34 | A-1 | B-18 | 430 | 28 | >300 | 91 | A | A | 98 | 32 |
| | 35 | A-1 | B-19 | 420 | 28 | >300 | 91 | A | A | 98 | 32 |
| | 36 | A-1 | B-20 | 430 | 26 | >300 | 91 | A | A | 98 | 32 |
| | 37 | A-1 | B-21 | 430 | 24 | >300 | 92 | A | A | 98 | 32 |
| | 38 | A-1 | B-22 | 440 | 25 | 57 | 90 | A | A | 98 | 32 |
| | 39 | A-1 | B-23 | 420 | 31 | >300 | 88 | A | A | 97 | 34 |
| | 40 | A-1 | B-24 | 440 | 26 | >300 | 91 | A | A | 98 | 32 |
| | 41 | A-1 (D) | B-28 (C) | 430 | 25 | >300 | 91 | A | A | 97 | 31 |
| Comparative Example 1 | 42 | A-15 | B-3 | 410 | 32 | >300 | 86 | A | AB | 87 | 32 |
| | 43 | A-16 | B-3 | 420 | 28 | 89 | 94 | AB | D | 93 | 36 |
| | 44 | A-17 | B-3 | 420 | 25 | 53 | 94 | C | D | 92 | 40 |
| | 45 | A-19 | B-3 | 420 | 24 | >300 | 92 | D | D | 97 | 30 |
| | 46 | A-20 | B-3 | 430 | 19 | 81 | 32 | B | D | 97 | 28 |
| | 47 | A-1 | B-25 | 470 | 12 | 1.7 | 93 | A | A | 100 | 32 |
| | 48 | A-1 | B-26 | 440 | 25 | 0.8 | 92 | A | A | 98 | 31 |
| | 49 | A-1 | B-27 | 420 | 25 | 2.3 | 82 | A | A | 97 | 31 |

Test Nos. 1 to 41 represent the Example of the present invention, and Test Nos. 42 to 49 represent the Comparative Example.

In Test No. 42 as the Comparative Example, the glass transition temperature of component (A) is outside the range of the present invention, and when an emulsion of such component (A) and an emulsion of component (B) were mixed and precipitated to obtain a solid of a polymer composition C, the solid does not form a powder but aggregates, whereby there were operational disadvantages in the steps for the dehydration and washing with water of the precipitates, in the drying step or in the step of mixing with the elastomer-containing styrene resin.

In the tests other than Comparative Example Test No. 42, the solid of the polymer composition C was in a powder form in each case, and there was no operational disadvantage.

As is apparent from the Comparative Example, if the weight average molecular weight or the solubility parameter of component (A) is outside the range of the present invention, the lamellar peeling phenomenon or the flow mark tends to be distinct. If the glass transition temperature of component (A) is outside the range of the present invention, the heat resistance or the operation efficiency for the preparation tends to be inferior. If the gel content of component (A) is outside the range of the present invention, the gloss tends to be inferior. Likewise, if the solubility parameter, the gel content or the glass transition temperature of component (B) is outside the range of the present invention, the environmental stress cracking resistance tends to be inferior.

EXAMPLE 2 and COMPARATIVE EXAMPLE 2

Emulsion A-1 and emulsion B-3 prepared in Example 1, were mixed in an emulsion state in the proportions as identified in Table 6 (the parts in the Table represent the parts of the solid content of the polymer). Further, 7 parts of the 10% aqueous solution of Pluronic F-68 as used in Example 1, was added, relative to 100 parts of the solid content of the polymer mixture.

The emulsion mixture thus obtained was treated in the same manner as in Example 1 to obtain polymer compositions C-1 to C-8.

Then, the same ABS resin powder, AS resin powder and Mark 1500 as used in Example 1, were mixed together with polymer compositions C-1 to C-8, in the following proportions, and then pelletized.

ABS resin powder: 30 parts
AS resin powder: 54 parts
Mark 1500: 0.2 part
Polymer composition C: 16 parts Pellets thus obtained were subjected to the evaluation of the physical properties in the same manner as in Example 1. The results are shown in Table 7.

TABLE 6

| | Polymer composition C | | | | | | | |
|---|---|---|---|---|---|---|---|---|
| | C-1 | C-2 | C-3 | C-4 | C-5 | C-6 | C-7 | C-8 |
| Amount of A-1 (parts) | 20 | 30 | 40 | 70 | 80 | 90 | 10 | 95 |
| Amount of B-3 (parts) | 80 | 70 | 60 | 30 | 20 | 10 | 90 | 5 |

TABLE 7

| Example or Comparative Example | Test No. | Polymer composition | Tensile yield strength (kg/cm$^2$) | Izod impact strength (kg·cm/cm) | Chemical resistance (min) | Gloss (%) | Lamellar peeling | Flow mark | Vicat softening point (°C.) | Spiral flow (cm) |
| --- | --- | --- | --- | --- | --- | --- | --- | --- | --- | --- |
| Example 2 | 51 | C-1 | 370 | 31 | >300 | 92 | B | B | 93 | 36 |
|  | 52 | C-2 | 390 | 30 | >300 | 91 | B | A | 98 | 34 |
|  | 53 | C-3 | 420 | 28 | >300 | 92 | A | A | 98 | 33 |
|  | 54 | C-4 | 460 | 25 | 42 | 92 | A | A | 101 | 31 |
|  | 55 | C-5 | 480 | 23 | 27 | 92 | A | A | 102 | 30 |
|  | 56 | C-6 | 490 | 22 | 6.8 | 92 | A | A | 102 | 30 |
| Comparative | 57 | C-7 | 340 | 32 | >300 | 90 | C | C | 95 | 36 |
| Example 1 | 58 | C-8 | 490 | 21 | 1.4 | 93 | A | A | 102 | 29 |

It is evident from Comparative Example 2 that if the content of component (B) in the polymer composition C is lower than the lower limit of the range of the present invention, the environmental stress cracking resistance tends to be inferior, and if it exceeds the upper limit, the lamellar peeling or the flow mark tends to be remarkable, such being undesirable.

EXAMPLE 3 and COMPARATIVE EXAMPLE 3

50 parts (as solid content of polymer) of emulsion A-1 and 50 parts (as solid content of polymer) of emulsion B-3 prepared in Example 1, were mixed in an emulsion state, and 7 parts of the 10% aqueous solution of Pluronic F-68, was further added thereto.

The emulsion mixture thus obtained was subjected to precipitation treatment in the same manner as in Example 1, whereby a powder of a polymer composition C was obtained.

Then, the polymer composition C was supplied to VC-40 type extruder manufactured by K.K. Chuo Kikai Seisakusho to obtain pellets.

Separately, polymers D-1 to D-8 having the compositions as identified in Table 8, were mixed in the proportions as identified in Table 9, and the respective mixtures were supplied to VC-40 type extruder to obtain pellets of elastomer-containing styrene resins E-1 to E-7.

Polymers D-1 and D-6 are the ABS resin and the AS resin used in Example 1, respectively.

Then, pellets of the polymer composition C and pellets of elastomer-containing styrene resins E-1 to E-7 were mixed in the proportions as identified in Table 10, and the respective mixtures were supplied to and kneaded by VC-40 type extruder to obtain pellets.

The pellets thus obtained were subjected to the evaluation of the physical properties in the same manner as in Example 1. The results are shown in Table 10. The spiral flow was measured at a cylinder temperature of 280° C. in Test Nos. 64, 65, 77 and 78 and at a cylinder temperature of 260° C. for the rest.

TABLE 8

| Sample No. | Polybutadiene (%) | SBR rubber (%) | EPDM rubber (%) | Acryl rubber (%) | Acrylonitrile (%) | Styrene (%) | Methyl methacrylate (%) | α-methylstyrene (%) | N—Phenyl maleimide (%) |
| --- | --- | --- | --- | --- | --- | --- | --- | --- | --- |
| D-1 | 50 | 0 | 0 | 0 | 13 | 37 | 0 | 0 | 0 |
| D-2 | 25 | 15 | 0 | 0 | 15 | 45 | 0 | 0 | 0 |
| D-3 | 40 | 0 | 0 | 0 | 13 | 40 | 7 | 0 | 0 |
| D-4 | 0 | 0 | 18 | 0 | 18 | 64 | 0 | 0 | 0 |
| D-5 | 0 | 0 | 0 | 22 | 20 | 58 | 0 | 0 | 0 |
| D-6 | 0 | 0 | 0 | 0 | 30 | 70 | 0 | 0 | 0 |
| D-7 | 0 | 0 | 0 | 0 | 24 | 0 | 0 | 76 | 0 |
| D-8 | 0 | 0 | 0 | 0 | 19 | 0 | 0 | 61 | 20 |

TABLE 9

| Sample No. | Component | |
| --- | --- | --- |
| E-1 | D-1 | 32 Parts |
|  | D-6 | 68 Parts |
| E-2 | D-2 | 40 Parts |
|  | D-6 | 60 Parts |
| E-3 | D-3 | 40 Parts |
|  | D-6 | 60 Parts |
| E-4 | D-4 | 100 Parts |
| E-5 | D-5 | 100 Parts |
| E-6 | D-1 | 36 Parts |
|  | D-7 | 64 Parts |
| E-7 | D-1 | 36 Parts |
|  | D-8 | 64 Parts |

TABLE 10

| Example or Comparative Example | Test No. | Component (E)* | Amount of component (E) | Amount of polymer composition C | Tensile yield strength (kg·cm$^2$) | Izod impact strength (kg·cm/cm) | Chemical resistance (min) | Gloss (%) | Lamellar peeling | Flow mark | Vicat softening point (°C.) | Spiral flow (cm) |
| --- | --- | --- | --- | --- | --- | --- | --- | --- | --- | --- | --- | --- |
| Example 3 | 59 | E-1 | 84 | 16 | 460 | 16 | >300 | 93 | A | A | 99 | 34 |
|  | 60 | E-2 | 84 | 16 | 370 | 14 | >300 | 93 | A | A | 94 | 36 |
|  | 61 | E-3 | 84 | 16 | 390 | 12 | >300 | 87 | A | A | 96 | 40 |
|  | 62 | E-4 | 84 | 16 | 410 | 8.8 | >300 | 72 | A | A | 95 | 27 |
|  | 63 | E-5 | 84 | 16 | 360 | 8.0 | >300 | 77 | A | A | 90 | 28 |
|  | 64 | E-6 | 84 | 16 | 430 | 17 | >300 | 91 | A | A | 108 | 25 |
|  | 65 | E-7 | 84 | 16 | 480 | 5.2 | >300 | 92 | A | A | 129 | 24 |
|  | 66 | E-1 | 98 | 2 | 480 | 21 | 3.1 | 95 | A | AB | 100 | 35 |
|  | 67 | E-1 | 90 | 10 | 470 | 22 | 40 | 95 | A | A | 99 | 35 |
|  | 68 | E-1 | 70 | 30 | 450 | 14 | >300 | 92 | A | A | 97 | 32 |

TABLE 10-continued

| Example or Comparative Example | Test No. | Component (E)* | Amount of component (E) | Amount of polymer composition C | Tensile yield strength (kg · cm²) | Izod impact strength (kg · cm/ cm) | Chemical resistance (min) | Gloss (%) | Lamellar peeling | Flow mark | Vicat softening point (°C.) | Spiral flow (cm) |
| --- | --- | --- | --- | --- | --- | --- | --- | --- | --- | --- | --- | --- |
| | 69 | E-1 | 60 | 40 | 440 | 9.8 | >300 | 86 | A | A | 97 | 31 |
| | 70 | E-1 | 50 | 50 | 420 | 6.7 | >300 | 84 | B | A | 94 | 30 |
| Comparative | 71 | E-1 | 40 | 60 | 400 | 2.2 | >300 | 77 | C | B | 90 | 28 |
| tive | 72 | E-1 | 100 | 0 | 490 | 22 | 1.2 | 95 | A | C | 102 | 36 |
| Example 3 | 73 | E-2 | 100 | 0 | 400 | 21 | 1.1 | 92 | A | C | 98 | 38 |
| | 74 | E-3 | 100 | 0 | 420 | 17 | 0.7 | 89 | A | C | 99 | 42 |
| | 75 | E-4 | 100 | 0 | 430 | 14 | 1.8 | 79 | AB | D | 97 | 29 |
| | 76 | E-5 | 100 | 0 | 380 | 11 | 6.6 | 74 | AB | D | 94 | 30 |
| | 77 | E-6 | 100 | 0 | 460 | 14 | 2.4 | 94 | A | D | 113 | 26 |
| | 78 | E-7 | 100 | 0 | 500 | 9.1 | 6.1 | 95 | A | D | 134 | 25 |

*Elastomer-containing styrene resin

Test Nos. 59 to 70 in Table 10 represent the Example of the present invention, and Test Nos. 71 to 78 represent the Comparative Example.

From the comparison between Test Nos. 59 to 65 and Test Nos. 72 to 78, it is evident that the compositions according to the present invention have excellent environmental stress cracking resistance regardless of the type of the elastomer-containing styrene resin, and yet no lamellar peeling phenomenon or no flow mark appears.

Further, from the comparison of Test Nos. 66 to 72, it is evident that if the proportions of the polymer composition C and the elastomer-containing styrene resin are outside the ranges of the present invention, the resulting compositions are inferior in the environmental stress cracking resistance or in the impact resistance.

EXAMPLE 4 and COMPARATIVE EXAMPLE 4

The polymer composition C as used in Example 3, samples D-1 and D-6 as identified in Table 8 and Mark 1500 were mixed in the proportions as identified in Table 11, and the respective mixtures were supplied to VC-40 type extruder to obtain pellets.

The pellets thus obtained were subjected to the evaluation of the physical properties in the same manner as in Example 1. The results are shown in Table 11.

Test No. 83 represents a case where the amount of the polymer composition C exceeded the upper limit of the range of the present invention. Consequently, the thermoplastic resin composition obtained by mixing it with the elastomer-containing styrene resin, is inferior in the rigidity, the heat resistance and the lamellar peeling resistance, such being undesirable.

Test No. 71 in Comparative Example 3 in Table 10 also represents a case, like Test No. 83, wherein the amount of the polymer composition exceeded the upper limit of the range of the present invention, but the thermoplastic resin composition thereby obtained is inferior in the impact resistance, thus showing a behavior different from that of Test No. 83. The difference in the physical properties between Test No. 71 and Test No. 83 is based on the difference in the elastomer-content contained in the elastomer-containing styrene resins used.

COMPARATIVE EXAMPLE 5

80 parts (as solid content of polymer) of an emulsion of sample D-1 as identified in Table 8 and 20 parts (as solid content of polymer) of an emulsion of sample B-3 as prepared in Example 1, were mixed in an emulsion state, and then poured into an aqueous solution containing 5 parts of calcium chloride dihydrate and the mixture was stirred at a temperature of from 90 to 95° C. for precipitation.

The slurry thus obtained was subjected to filtration, followed by washing with water and drying, and 40 parts of a powder thereby obtained was mixed with 60 parts of a powder of sample D-6 as identified in Table 8 and 0.2 part of Mark 1500 in a Henschel mixer, and the mixture was supplied to VC-40 type extruder to obtain pellets.

The pellets thus obtained were subjected to the evaluation of the physical properties in the same manner as in Example 1, whereby the tensile yield strength was 410 kg/cm², the izod impact strength was 29 kgcm/cm², the chemical resistance was >300 minutes, the gloss was

TABLE 11

| Example or Comparative Example | Test No. | Amount of D-1 (parts) | Amount of D-6 (parts) | Amount of polymer composition C | Tensile yield strength (kg · cm²) | Izod impact strength (kg · cm/ cm) | Chemical resistance (min) | Gloss (%) | Lamellar peeling | Flow mark | Vicat softening point (°C.) | Spiral flow (cm) |
| --- | --- | --- | --- | --- | --- | --- | --- | --- | --- | --- | --- | --- |
| Example 4 | 79 | 20 | 64 | 16 | 500 | 7.4 | 206 | 97 | A | A | 102 | 34 |
| | 80 | 40 | 44 | 16 | 370 | 39 | >300 | 91 | A | A | 96 | 29 |
| | 81 | 30 | 40 | 30 | 340 | 34 | >300 | 88 | A | A | 87 | 30 |
| | 82 | 30 | 30 | 40 | 290 | 41 | >300 | 84 | AB | A | 79 | 29 |
| Comparative Example 4 | 83 | 30 | 10 | 60 | 120 | 47 | >300 | 71 | C | A | 62 | 27 |

88%, the lamellar peeling resistance was C, the flow mark was D, the vicat softening temperature was 97° C., the spiral flow (at the cylinder temperature of 260° C.) was 36 cm, thus inferior in the lamellar peeling resistance and the flow mark.

COMPARATIVE EXAMPLE 6

30 parts (as solid content of polymer) of an emulsion of sample D-1 as identified in Table 8, 62 parts (as solid content of polymer) of an emulsion of sample D-7 as identified in Table 8 and 8 parts (as solid content of polymer) of an emulsion of sample B-3 as prepared in Example 1, were mixed in an emulsion state, and the mixture was poured into an aqueous solution containing 5° C. parts of calcium chloride dihydrate, and stirred at 105° C. for precipitation.

The slurry thus obtained was subjected to filtration, followed by washing with water and drying, and 100 parts by a powder thereby obtained was mixed together with 0.2 part of Mark 1500 in a Henschel mixer, and the mixture was supplied to VD-40 type extruder to obtain pellets.

The pellets thus obtained was subjected to the evaluation of the physical properties in the same manner as in Example 1, whereby the tensile yield strength was 420 kg/cm$^2$, the izod impact strength was 14 kgcm/cm, the chemical resistance was >300 minutes, the gloss was 93%, the lamellar peeling resistance was D, the flow mark was D, the vicat softening temperature was 110° C. and the spiral flow (at a cylinder temperature of 280° C.) was 23 cm, thus inferior in the lamellar peeling resistance and the flow mark.

EXAMPLE 5 and COMPARATIVE EXAMPLE 7

50 parts (as solid content of polymer) of an emulsion of sample A-24 as prepared in Example 1 and 50 parts (as solid content of polymer) of an emulsion of sample B-3, were mixed in an emulsion state, and 7 parts of an aqueous solution containing 10% of Pluronic F-68, was added thereto. The emulsion mixture thus obtained was treated for precipitation in the same manner as in Example 1 to obtain a powder of polymer composition C.

Then, a high impact polystyrene resin comprising 7% of polybutadiene and 93% of polystyrene and having a weight average molecular weight, based on polystyrene, of 2.15×10$^5$, and the above polymer composition C were mixed in the proportions as identified in Table 12, and the respective mixtures were supplied to VC-40 type extruder to obtain pellets.

A molded product was prepared from the pellets, and the physical properties were evaluated. The results are shown in Table 12. However, the chemical resistance was observed for 180 minutes with a deflection of 20 mm. In Table 11, >180 means that no rupture was observed upon expiration of 180 minutes.

TABLE 12

| Example or Comparative Example | Test No. | Amount or polymer composition C (parts) | Amount of high impact polystyrene resin (parts) | Tensile yield strength (kg/cm$^2$) | Izod impact strength (kg·cm/cm) | Chemical resistance (min) | Gloss (%) | Lemaller peeling | Vicat softening point (°C.) | Flow mark |
|---|---|---|---|---|---|---|---|---|---|---|
| Example 5 | 84 | 5 | 95 | 300 | 7.5 | 121 | 64 | A | 95 | A |
|  | 85 | 10 | 90 | 290 | 7.4 | >180 | 67 | A | 94 | A |
|  | 86 | 20 | 80 | 300 | 7.6 | >180 | 64 | A | 87 | A |
| Comparative Example 7 | 87 | 0 | 100 | 320 | 7.9 | 9.6 | 64 | A | 97 | A |

As is evident from Table 12, the polymer composition C of the present invention can suitably be employed also for a high impact polystyrene resin.

I claim:

1. A thermoplastic resin composition comprising from 0.5 to 50% by weight of the polymer composition obtained by mixing, in an emulsion state,
   (A) from 20 to 90% by weight (as solid content of polymer) of an emulsion of polymer component (A) which is a polymer of a vinyl monomer and has a glass transition temperature of higher than 20° C., a gel content of not higher than 10% and a solubility parameter of from 8.0 to 11.0 (cal/cc)$^{\frac{1}{2}}$ and which has a weight average molecular weight, based on polystyrene, of at least 1.5×10$^5$, and
   (B) from 10 to 80% by (as solid content of polymer) of an emulsion of polymer component (B) which is a homopolymer of an acrylate monomer, a copolymer of acrylate monomers or a copolymer of an acrylate monomer with other copolymerizable monomer and has a glass transition temperature of not higher than 20° C., a gel content of not higher than 70% and a solubility parameter of from 8.4 to 9.8 (cal/cc)$^{\frac{1}{2}}$, and separating the polymer from the emulsion mixture, and from 50 to 99.5% by weight of an elastomer-containing styrene resin comprising an elastomer component and a resin component having a glass transition temperature of higher than 20° C., with a covalent substance of the elastomer and resin components being present at the interface between the elastomer component constituting a dispersed phase and the resin component constituting a continuous phase.

2. The thermoplastic resin composition according to claim 1, wherein component (A) is polystyrene.

3. The thermoplastic resin composition according to claim 1, wherein component (A) is poly(styreneacrylonitrile).

4. The thermoplastic resin composition according to claim 1, wherein the monomer for component (B) is an acrylate monomer.

5. The thermoplastic resin composition according to claim 1, wherein the monomer for component (B) comprises at least one monomer selected from the group consisting of a methacrylate monomer, an aromatic vinyl monomer, a vinyl cyanide monomer, an olefin monomer and a vinyl ether monomer, and an acrylate monomer.

6. The thermoplastic resin composition according to claim 1, wherein both components (A) and (B) are produced by emulsion polymerization.

7. The thermopplastic resin composition according to claim 1, wherein from 40 to 80% by weight of component (A) and from 20 to 60% by weight of component (B) are mixed in an emulsion state.

8. The thermoplastic resin composition according to claim 1, wherein the monomer constituting the elastomer component contains, as an essential component, a monomer selected from the group consisting of a conjugated diene monomer, an olefin monomer and an acrylate monomer.

9. The thermoplastic resin composition according to claim 1, wherein the monomer constituting the resin component is an aromatic vinyl monomer.

10. The thermoplastic resin composition according to claim 1, wherein the monomer constituting the resin component comprises an aromatic vinyl monomer and at least one monomer selected from the group consisting of a vinyl cyanide monomer, a (meth)acrylate monomer and a maleimide monomer.

11. The thermoplastic resin composition according to claim 1, wherein the elastomer-containing styrene resin is prepared by polymerizing the monomer for the resin component in the presence of the elastomer component.

12. The thermoplastic resin composition according to claim 1, wherein the elastomer-containing styrene resin is a mixture comprising an elastomer-containing styrene resin prepared by polymerizing a monomer for the resin component in the presence of the elastomer component and an additional resin component composed of a polymer of a vinyl monomer separately polymerized and having a glass transition temperature of higher than 20° C.

13. The thermoplastic resin composition according to claim 1, wherein not higher than 20% by weight of the total amount of the monomers for component (B) is polyethylene glycol mono(meth)acrylate or polypropylene glycol mono(meth)acrylate.

* * * * *